United States Patent [19]

Kommrusch

[11] Patent Number: 5,109,536
[45] Date of Patent: Apr. 28, 1992

[54] SINGLE-BLOCK FILTER FOR ANTENNA DUPLEXING AND ANTENNA-SUMMED DIVERSITY

[75] Inventor: Richard S. Kommrusch, Schaumburg, Ill.

[73] Assignee: Motorola, Inc., Schaumburg, Ill.

[21] Appl. No.: 635,414

[22] Filed: Jan. 3, 1991

Related U.S. Application Data

[63] Continuation of Ser. No. 428,146, Oct. 27, 1989, abandoned.

[51] Int. Cl.[5] .......................... H04B 1/48; H04B 7/02; H01P 5/12; H01P 1/20
[52] U.S. Cl. ..................................... 455/82; 455/272; 333/134; 333/202
[58] Field of Search ....................... 455/78, 80, 82, 83, 455/84, 272-273, 275, 277, 280; 333/202, 207, 223, 134

[56] References Cited

U.S. PATENT DOCUMENTS

| | | | |
|---|---|---|---|
| 4,186,359 | 1/1980 | Kaegebein | 333/207 |
| 4,361,905 | 11/1982 | Etherington et al. | 455/80 |
| 4,462,098 | 7/1984 | D'Avello et al. | 370/30 |
| 4,464,640 | 8/1984 | Nishikawa et al. | 333/202 |
| 4,476,575 | 10/1984 | Franke et al. | 455/78 |
| 4,509,165 | 4/1985 | Tamura | 455/83 |
| 4,584,709 | 4/1986 | Kneisel et al. | 455/78 |
| 4,584,713 | 4/1986 | Bruckert et al. | 455/277 |
| 4,680,749 | 7/1987 | Englund et al. | 370/11 |
| 4,692,726 | 9/1987 | Green et al. | 333/202 |
| 4,704,734 | 11/1987 | Menich et al. | 455/134 |
| 4,716,391 | 12/1987 | Moutrie et al. | 333/202 |
| 4,742,562 | 5/1988 | Kommrusch | 455/78 |
| 4,829,274 | 5/1989 | Green et al. | 455/82 |
| 4,853,972 | 8/1989 | Ueda et al. | 455/78 |
| 4,879,533 | 11/1989 | de Muro et al. | 333/202 |
| 4,914,714 | 4/1990 | Tamura | 455/277 |

*Primary Examiner*—Reinhard J. Eisenzopf
*Assistant Examiner*—Lisa Charouel
*Attorney, Agent, or Firm*—Rolland R. Hackbart

[57] ABSTRACT

A single-block ceramic filter (102) is coupled to two antennas (142 and 144) for providing both antenna duplexing and antenna-summed diversity in a duplex radio transceiver (100). One antenna (142) is coupled by the filter (102) to a transmitter (132) and to a receiver (130), and a second antenna (144) is switchably coupled by the filter (102) to the receiver (130) by diversity control circuitry (101) in response to a diversity control signal (137). A microcomputer (134) in the transceiver (100) is coupled to the receiver (130) for monitoring the received signal strength (135). When the received signal strength (135) drops in level indicating that the signal being received on the antennas (142 to 144) has become degraded due to fading or other interference, the microcomputer (134) changes the binary state of the diversity control signal (137) for switching the receiver (130) between antenna (142) and both antennas (142 and 144).

16 Claims, 2 Drawing Sheets

SINGLE-BLOCK FILTER FOR ANTENNA DUPLEXING AND ANTENNA-SUMMED DIVERSITY

This is a continuation of application Ser. No. 07/428,146, filed Oct. 27, 1989 and now abandoned.

Background of the Invention

The present invention relates generally to radio frequency (RF) signal filters, and more particularly to a single-block filter for antenna duplexing and antenna-switched diversity in duplex radio transceivers.

A prior art single-block ceramic filter for antenna duplexing is shown and described in U.S. Pat. No. 4,742,562. However, such prior art single-block ceramic filter does not accommodate antenna-switched diversity.

In the past, antenna-switched diversity has been used to minimize the effects of signal fading in mobile radio communications systems, a problem which is aggravated in cellular telephone systems due to operating frequencies above 800 MHz. According to a prior antenna-switched diversity scheme, a receiver is switched between a first antenna and a second antenna in response to detection of degradation in the received signal. This has been accomplished in prior art cellular telephones by utilizing a transmit filter and two separate receive filters and switching the input of the cellular telephone receiver between the two receive filters, or by using a transmit filter and a receive filter and switching the input of the receive filter between the two antennas. However, in both of the foregoing instances two separate filters are required.

OBJECTS OF THE INVENTION

Accordingly, it is an object of the present invention to provide a single-block filter that is capable of both antenna duplexing and antenna-summed diversity in a duplex radio transceiver.

It is another object of the present invention to provide a single-block filter that utilizes a single switch for antenna-summed diversity in a duplex radio transceiver.

DETAILED DESCRIPTION OF THE PREFERRED EMBODIMENT

Figure 1:
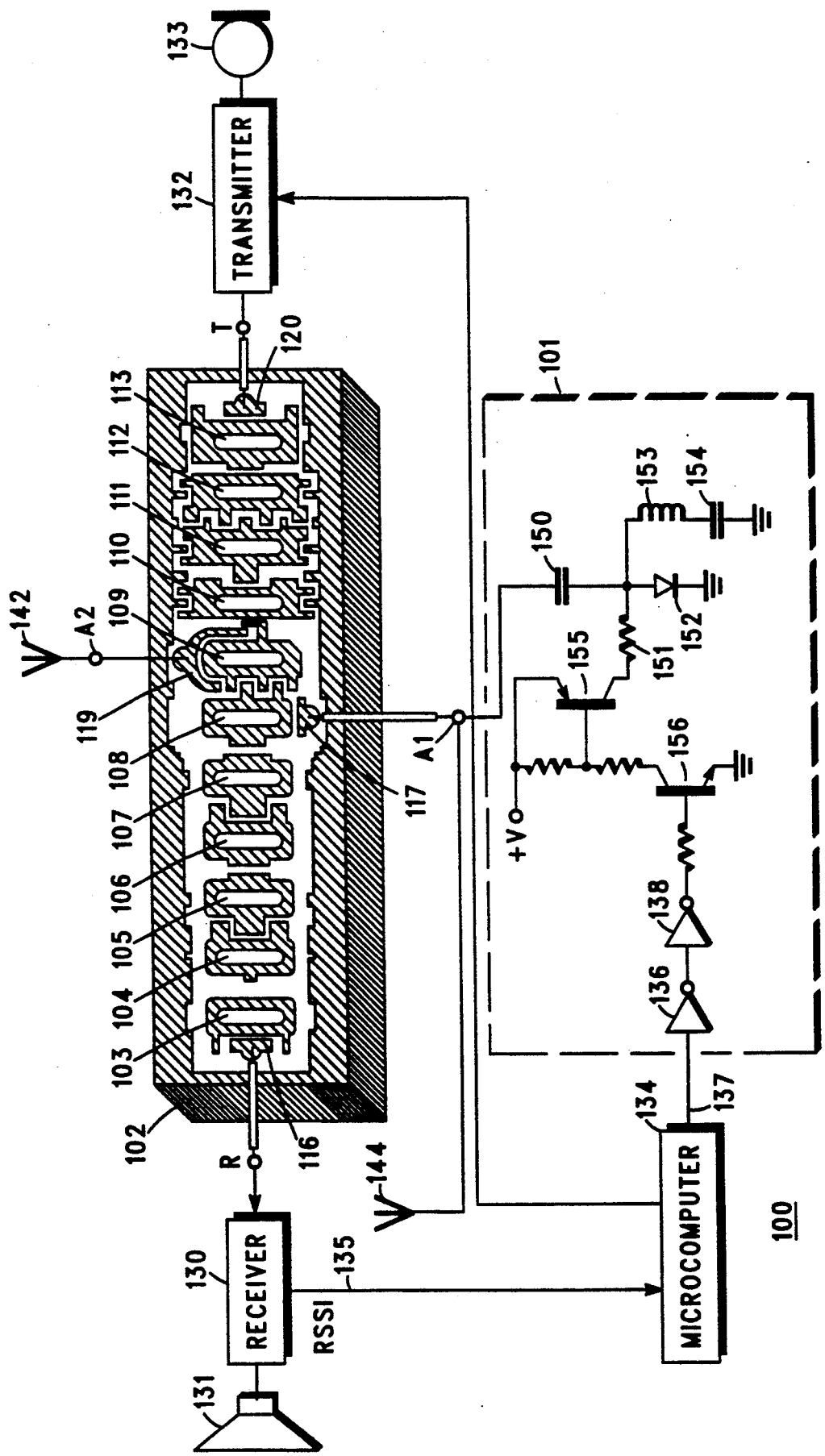
FIG. 1 illustrates a duplex radio transceiver including two antennas coupled to a single-block filter shown in perspective and embodying the present invention.

Referring to FIG. 1, there is illustrated a duplex radio transceiver 100 including two antennas 142 and 144 coupled to a single-block filter 102 shown in perspective and embodying the present invention for providing both antenna duplexing and antenna-summed diversity. Duplex radio transceiver 100 also includes receiver 130 coupled to speaker 131, transmitter 132 coupled to microphone 133, diversity control circuitry 101 coupled to antenna 144, and microcomputer 134 coupled to receiver 130, transmitter 132 and diversity control circuitry 101 for controlling the operation thereof. Blocks 130, 131, 132, 133 and 134 of transceiver 100 may be components of any commercially available duplex radio transceiver. In the preferred embodiment, transceiver 100 is the transceiver shown and described in Motorola instruction manual number 68P81070E40, entitled "DYNATAC Cellular Mobile Telephone," published by and available from Motorola C & E Parts, 1313 East Algonquin Road, Schaumburg, Ill. 60196.

According to the present invention, single-block filter 102 is coupled to antennas 142 and 144 for providing both antenna duplexing and antenna-summed diversity. Antenna 142 is coupled by filter 102 to transmitter 132, antenna 142 is coupled by filter 102 to receiver 130, and antenna 144 is switchably coupled by filter 102 to receiver 130 by diversity control circuitry 101 in response to diversity control signal 137. Microcomputer 134 is coupled to receiver 130 for monitoring the received signal strength indication (RSSI) signal 135. When the RSSI signal 135 drops in level indicating that the signal being received on one of the antennas 142 or 144 has become degraded due to fading or other interference, microcomputer 134 changes the binary state of diversity control signal 137 for switching receiver 130 to the other one of antennas 142 or 144.

Diversity control circuitry 101 includes pin diode 152 which is switched on and off in response to diversity control signal 137 for switching antenna 144 from and to receiver 130, respectively. When antenna 144 is selected, pin diode 152 is switched off. That is both antennas 142 and 144 are simultaneously coupled to receiver 130 when pin diode 152 is switched off, and receiver 130 gets the sum of the signals received by both antennas 142 and 144. Conversely, when antenna only 142 is selected, pin diode 152 is switched on to couple pad 117 of filter 102 to RF signal ground, decoupling antenna 144 from receiver 130. Pin diode 152 is switched on and off in response to the binary state of diversity control signal 137.

When diversity control signal 137 has a binary one state, the output of inverter 136 has a binary zero state (low voltage) and the output of inverter 138 has a binary one state (high voltage). The binary one state of the output of inverter 138 turns on transistor 156. When transistor 156 is on (conducting current), transistor 155 is turned on and applies a bias current to pin diode 152 via resistor 151. Pin diode 152 is switched on (low impedance state) by this bias current and couples pad 117 and antenna 144 via capacitor 150 to RF signal ground. Pad 117 is preferably coupled by a coaxial cable or alternatively a transmission line to capacitor 150 and antenna 144. It is also preferable that capacitor 150 and pin diode 152 be located as close to the end A1 of such coaxial cable as practical.

Conversely, when diversity control signal 137 has a binary zero state, the output of inverter 136 has a binary one state (high voltage) and the output of inverter 138 has a binary zero state (low voltage). The binary zero state of the output of inverter 137 turns off transistor 156. When transistor 156 is off, transistor 155 is turned off, keeping pin diode 152 off (high impedance state). Inductor 153 and capacitor 154 are coupled in parallel with pin diode 152 for resonating out parasitics due to pin diode 152 to achieve better open and short circuit conditions.

Filter 102 in FIG. 1 is a dielectric block filter preferably comprised of a high-dielectric low-loss ceramic. Filter 102 may also be partially enclosed in a housing, such as the housing shown in U.S. Pat. No. 4,742,562, which housing may be attached by soldering or other means producing a modular filter component, which may be mounted on a printed circuit board. Filter 102 includes transmission line resonators formed by elongated holes 103-113 extending from the top surface to the bottom surface thereof. Holes 103-113 have a substantially rectangular cross section with rounded corners and parallel elongated sides. The bottom and sides of filter 102 and internal surfaces of holes 103-113 are covered with conductive material over substantially their entire surfaces. The top surface of filter 102 is covered by a strip of conductive material near the periphery thereof which substantially surrounds holes 103-113. Also disposed on the top surface are pads for each hole 103-113, pad 120 coupled by a coaxial cable (at end T) to transmitter 132, pad 116 coupled by a coaxial cable (at end R) to receiver 130, pad 119 coupled by a coaxial cable (at end A2) to antenna 142, and pad 117 coupled by a coaxial cable (at end A1) to antenna 144 and capacitor 150. The pads for each hole 103-113 and pads 116-120 are likewise comprised of conductive material covering the top surface of filter 102. The pads for holes 103-113 have varying shapes for capacitively intercoupling with one another and coupling to the surrounding conductive material at the sides of filter 102. Each of the holes 103-113 functions essentially as a foreshortened transmission line resonator. In the preferred embodiment, the conductive material covering the surfaces of filter 102 is plated thereon.

When pad 117 is coupled to RF signal ground, filter 102 functions as a duplexer coupling receiver 130 and transmitter 132 to antenna 142. Conversely, when pad 117 is not coupled to RF signal ground, receiver 130 is coupled via pad 117 to antenna 144 and simultaneously to antenna 142, and transmitter 132 is coupled to antenna 142. The first transmission zero of the receiver resonators 108-103 provides isolation so that the signal from transmitter 132 is not coupled to antenna 144. The amount of coupling provided by pad 117 can be varied by increasing or decreasing the capacitive coupling between pad 117 and the pad for hole 107, by decreasing or increasing, respectively, the gap between pad 117 and the pad for hole 107, by varying the size of the opposing edges of pads 107 and 117, or by any other suitable means.

Figure 2:
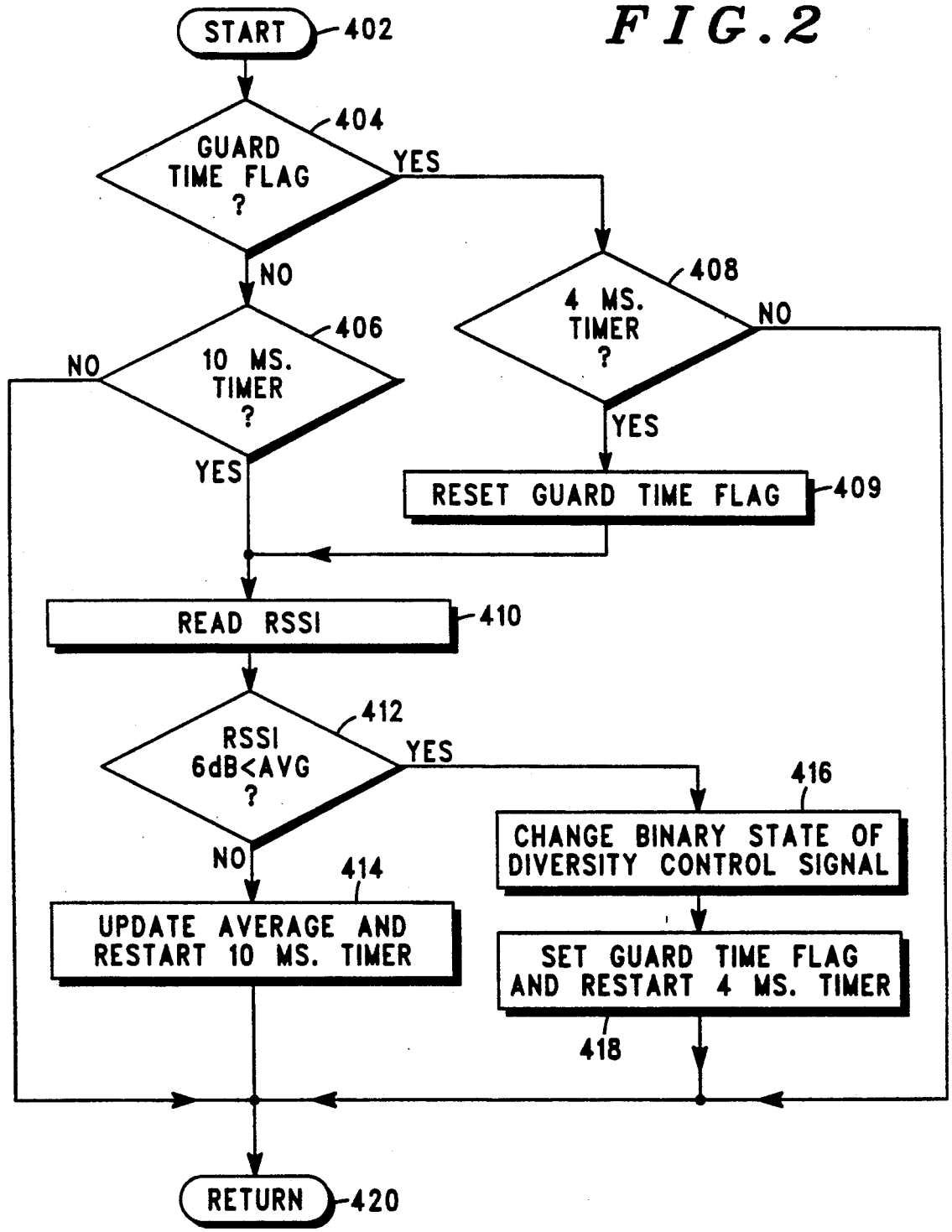
FIG. 2 is a flow chart of the process used by the microcomputer in FIG. 1 for selecting between the two antennas coupled to the duplex radio transceiver.

Referring next to FIG. 2, there is illustrated a flow chart of the process used by the microcomputer 134 in FIG. 1 for selecting between antenna 142 and both antennas 142 and 144. Entering at START block 402, the process proceeds to block 404, where the guard time flag is checked. If the guard time flag has a binary one state, YES branch is taken to block 408. At block 408, a check is made to determine if the four millisecond timer (4 MS) has timed out. If not, NO branch is taken to RETURN block 420 to return to other tasks. If the four millisecond timer (4 MS) has timed out, YES branch is taken from block 408 to block 409 where the guard time flag is reset to a binary zero state. Thereafter, program control proceeds to block 410 as described hereinbelow.

Returning to block 404, if the guard time flag has a binary zero state, NO branch is taken to block 406, where a check is made to determine if the ten millisecond timer (10 MS) has timed out. If not, NO branch is taken to RETURN block 420 to return to other tasks. If the 10 MS timer has timed out, YES branch is taken from block 406 to block 410 where an RSSI sample is taken. Block 410 is also reached from blocks 408 and 409 after the 4 MS timer has timed out. Microcomputer 134 includes an analog-to-digital converter for taking a digitized sample of the RSSI signal 135. Next, at block 412, a check is made to determine if the RSSI sample is 6 dB less than the average RSSI. The average RSSI is a running average taken by microcomputer 134 over the last fifty RSSI samples. If the RSSI sample is not 6 dB less than the average RSSI, NO branch is taken from block 412 to block 414 where the average RSSI is updated using the current RSSI sample, and the 10 MS timer is restarted for another ten millisecond time interval. Thereafter, program control returns to other tasks at RETURN block 420.

Returning to block 412, if the RSSI sample is 6 dB less than the average RSSI, YES branch is taken to block 416 where the binary state of the diversity control signal 137 is changed to switch between antenna 142 and both antennas 142 and 144. Next, at block 418 the guard time flag is set to a binary one state, and the 4 MS timer is restarted for a four millisecond time interval. The guard time flag is set in order to sample the RSSI signal 135 four milliseconds after switching between antenna 142 and both antennas 142 and 144. As a result, RSSI signal 135 will be sampled again after four milliseconds rather than ten milliseconds. The sampling interval is reduced in order to be sure that the antenna 142 or both antennas 142 and 144 being switched to are receiving an adequate RF signal. If antenna 142 alone and both antennas 142 and 144 together are receiving poor RF signals, receiver 130 will be switched from one to the other every four milliseconds. Thereafter, program control returns to other tasks at RETURN block 420.

In summary, a unique single-block filter has been described which is capable of providing both antenna duplexing and antenna-summed diversity in a duplex radio transceiver. The unique single-block filter may include a housing for providing a modular filter component, which may be mounted on a printed circuit board. The unique single-block filter of the present invention may be advantageously utilized in applications where RF filtering, antenna duplexing and/or antenna diversity is desired.

I claim:

1. A single-block filter for coupling a transmitter to a first antenna and coupling a receiver to the first antenna and a second antenna in response to a first binary state of a control signal from a signal source, and coupling the receiver only to the first antenna in response to the second binary state of the control signal, said single-block filter comprising:
    a dielectric block comprised of a dielectric material, having top, bottom and side surfaces and having at least first, second, third, and fourth holes each extending from the top surface toward the bottom surface and aligned with one another, said bottom and side surfaces and said four holes being substantially covered with a conductive material for producing a transmission line resonator for each hole;
    first coupling means coupling the transmitter to said first hole;
    second coupling means coupling the first antenna to said second hole;
    third coupling means for coupling said third hole to the second antenna in response to the first binary state of the control signal, and uncoupling said third hole from said second antenna in response to the second binary state of the control signal; and
    fourth coupling means for coupling said fourth hole to the receiver, whereby the receiver is coupled by said dielectric block to both the first antenna and the second antenna when the control signal has the first binary state.

2. The single-block filter of claim 1, wherein said third coupling means includes a pad comprised of a conductive material disposed on the top surface of the dielectric block adjacent to said third hole and switching means responsive to the first and second binary states of the control signal for switching the pad of said third coupling means between the second antenna and signal ground, respectively.

3. The single-block filter of claim 2, wherein said switching means includes pin diode means.

4. A radio, comprising:
   a first antenna;
   a second antenna;
   a transmitter having an output;
   a receiver having an input;
   control means coupled to the transmitter and receiver and producing a control signal having first and second binary states;
   a single-block filter for coupling the transmitter to the first antenna and coupling the receiver to the first antenna and the second antenna in response to the first binary state of the control signal, and coupling the receiver only to the first antenna in response to the second binary state of the control signal, said single block filter comprising: a dielectric block comprised of a dielectric material, having top, bottom and side surfaces and having at least first, second, third, and fourth holes each extending from the top surface toward the bottom surface and aligned with one another, said bottom and side surfaces and said four holes being substantially covered with a conductive material for producing a transmission line resonator for each hole; first coupling means coupling the output of the transmitter to said first hole; second coupling means coupling the first antenna to said second hole; third coupling means for coupling said third hole to the second antenna in response to the first binary state of the control signal, and uncoupling said third hole from said second antenna in response to the second binary state of the control signal; and fourth coupling means for coupling said fourth hole to the input of the receiver, whereby the receiver is coupled by said dielectric block to both the first antenna and the second antenna when the control signal has the first binary state.

5. The radio of claim 4, wherein said third coupling means includes a pad comprised of a conductive material disposed on the top surface of the dielectric block adjacent to said third hole and switching means responsive to the first and second binary states of the control signal for switching the pad of said third coupling means between the second antenna and signal ground, respectively.

6. The radio of claim 5, wherein said switching means includes pin diode means.

7. The radio of claim 4, wherein said receiver includes means for producing an output signal having a magnitude related to the strength of signal received by said receiver, and said control means includes processing means coupled to the output signal of the receiver for producing the first binary state of the control signal when the output signal of the receiver has a magnitude at least as great as a predetermined magnitude and the second binary state of the control signal when the output signal of the receiver has a magnitude less than the predetermined magnitude.

8. The radio of claim 7, wherein said processing means samples the output of the receiver at least once every predetermined time interval and thereafter produces the first or second binary state of the control signal.

9. A single-filter filter for coupling a transmitter to a first antenna and coupling a receiver to the first antenna and a second antenna in response to a first binary state of a control signal from a signal source, and coupling the receiver only to the first antenna in response to the second binary state of the control signal, said single-filter filter comprising:
   a dielectric block comprised of a dielectric material, having top, bottom and side surfaces and having at least first, second, third, and fourth holes each extending from the top surface toward the bottom surface and aligned with one another, said bottom and side surfaces and said four holes being substantially covered with a conductive material for producing a transmission line resonator for each hole, and the conductive material of each hole further extending at least partially to the top surface for producing a pad for each hole;
   first coupling means coupling the transmitter to said first hole, said first coupling means further including a pad comprised of a conductive material disposed on the top surface adjacent to the pad of said first hole;
   second coupling means coupling the first antenna to said second hole, said second coupling means further including a pad comprised of a conductive material disposed on the top surface adjacent to the pad of said second hole;
   third coupling means for coupling said third hole to the second antenna in response to the first binary state of the control signal, and uncoupling said third hole from said second antenna in response to the second binary state of the control signal, said third coupling means further including a pad comprised of a conductive material disposed on the top surface adjacent to the pad of said third hole; and
   fourth coupling means for coupling said fourth hole to the receiver, said fourth coupling means further including a pad comprised of a conductive material disposed on the top surface adjacent to the pad of said fourth hole, whereby the receiver is coupled by said dielectric block to both the first antenna and the second antenna when the control signal has the first binary state.

10. The single-block filter of claim 9, wherein said third coupling means includes switching means responsive to the first and second binary states of the control signal for switching the pad of said third coupling means between the second antenna and signal ground, respectively.

11. The single-block filter of claim 10, wherein said switching means includes pin diode means.

12. A radio, comprising:
   a first antenna;
   a second antenna;
   a transmitter having an output;
   a receiver having an input;
   control means coupled to the transmitter and receiver and producing a control signal having first and second binary states;

a single-block filter for coupling the transmitter to the first antenna and coupling the receiver to the first antenna and the second antenna in response to the first binary state of the control signal, and coupling the receiver only to the first antenna in response to the second binary state of the control signal, said single-block filter comprising: a dielectric block comprised of a dielectric material, having top, bottom and side surfaces and having at least first, second, third, and fourth holes each extending from the top surface toward the bottom surface and aligned with one another, said bottom and side surfaces and said four holes being substantially covered with a conductive material for producing a transmission line resonator for each hole, and the conductive material of each hole further extending at least partially to the top surface for producing a pad for each hole; first coupling means coupling the output of the transmitter to said first hole, said first coupling means further including a pad comprised of a conductive material disposed on the top surface adjacent to the pad of said first hole; second coupling means coupling the first antenna to said second hole, said second coupling means further including a pad comprised of a conductive material disposed on the top surface adjacent to the pad of said second hole; third coupling means for coupling said third hole to the second antenna in response to the first binary state of the control signal, and uncoupling said third hole from said second antenna in response to the second binary state of the control signal, said third coupling means further including a pad comprised of a conductive material disposed on the top surface adjacent to the pad of said third hole; and fourth coupling means for coupling said fourth hole to the input of the receiver, said fourth coupling means further including a pad comprised of a conductive material disposed on the top surface adjacent to the pad of said fourth hole, whereby the receiver is coupled by said dielectric block to both the first antenna and the second antenna when the control signal has the first binary state.

13. The radio of claim 12, wherein said third coupling means includes switching means responsive to the first and second binary states of the control signal for switching the pad of said third coupling means between the second antenna and signal ground, respectively.

14. The radio of claim 13, wherein said switching means includes pin diode means.

15. The radio of claim 12, wherein said receiver includes means for producing an output signal having a magnitude related to the strength of signal received by said receiver, and said control means includes processing means coupled to the output signal of the receiver for producing the first binary state of the control signal when the output signal of the receiver has a magnitude at least as great as a predetermined magnitude and the second binary state of the control signal when the output signal of the receiver has a magnitude less than the predetermined magnitude.

16. The radio of claim 15, wherein said processing means samples the output of the receiver at least once every predetemined time interval and thereafter produces the first or second binary state of the control signal.

* * * * *